(12) United States Patent
Hagiwara

(10) Patent No.: US 8,368,655 B2
(45) Date of Patent: Feb. 5, 2013

(54) INPUT DEVICE

(75) Inventor: Yasuji Hagiwara, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 617 days.

(21) Appl. No.: 12/273,833

(22) Filed: Nov. 19, 2008

(65) Prior Publication Data

US 2009/0128510 A1 May 21, 2009

(30) Foreign Application Priority Data

Nov. 19, 2007 (JP) ................................. 2007-298987

(51) Int. Cl.
*G06F 3/041* (2006.01)
(52) U.S. Cl. ......... 345/173; 345/157; 345/166; 345/175
(58) Field of Classification Search .................. 345/156, 345/157, 173, 158, 166, 168, 175
See application file for complete search history.

(56) References Cited

U.S. PATENT DOCUMENTS

| | | | | |
|---|---|---|---|---|
| 5,673,066 | A * | 9/1997 | Toda et al. ..................... | 345/157 |
| 6,124,845 | A * | 9/2000 | Toda et al. ..................... | 345/157 |
| 6,798,401 | B2 * | 9/2004 | DuFaux ......................... | 345/168 |
| 7,339,577 | B2 | 3/2008 | Sato et al. | |
| 8,031,172 | B2 * | 10/2011 | Kruse et al. .................... | 345/156 |
| 2005/0162402 | A1 * | 7/2005 | Watanachote ................. | 345/173 |
| 2005/0264527 | A1 * | 12/2005 | Lin .................. | 345/156 |
| 2007/0070051 | A1 * | 3/2007 | Westerman et al. ........... | 345/173 |
| 2009/0096746 | A1 * | 4/2009 | Kruse et al. .................... | 345/156 |
| 2011/0134034 | A1 * | 6/2011 | Daniel ........................... | 345/158 |

FOREIGN PATENT DOCUMENTS

| | | |
|---|---|---|
| JP | 2002-351606 | 12/2002 |
| JP | 2003-111171 | 4/2003 |

* cited by examiner

*Primary Examiner* — Thuy Pardo
(74) *Attorney, Agent, or Firm* — Hunton & Williams LLP

(57) ABSTRACT

An input device includes an operation surface, a first detection means, a second detection means, an operation signal generating means, and a transmission means. The operation signal generating means generates an operation signal used to perform a first operation on a screen where a detection result of the first detection means has been reflected, if the duration of the detection, which is performed at the same contact position by the first detection means, is shorter than a predetermined time. The operation signal generating means generates an operation signal used to perform a second operation on the screen where a detection result of the second detection means has been reflected, as long as the detection is continued at the same contact position, if the duration of the detection, which is performed at the same contact position by the first detection means, reaches the predetermined time.

18 Claims, 6 Drawing Sheets

INPUT DEVICE

CROSS REFERENCE TO RELATED APPLICATIONS

The present invention contains subject matter related to and claims the benefit of Japanese Patent Application JP2007-298987 filed in the Japanese Patent Office on Nov. 19, 2007, the entire contents of which is incorporated herein by reference.

BACKGROUND OF THE DISCLOSURE

1. Technical Field

The present invention relates to an input device, and more particularly, to an input device that is suitable for performing a desired operation on a screen displayed by a display device.

2. Related Art

In the past, various screens, such as a map screen and a music search screen, corresponding to the use of the apparatuses have been displayed on display devices provided in apparatuses, such as a personal computer, a digital audio player, and a mobile phone.

Further, in the past, various apparatuses have been provided with various input devices, such as a keyboard, a mouse, a remote control, and a space pointing device, as means for performing desired operations on screens displayed by the display devices.

Furthermore, an input device, which includes both a task switch and a pointing device referred to as a touch pad and can selectively perform a screen operation using the touch pad and a screen operation using the task switch by one operation surface provided in a device body, has been proposed in, for example, Japanese Unexamined Patent Application Publication No. 2002-351606.

Meanwhile, although not mainly performing a screen operation, an input device that sends an optical signal wave corresponding to a detection result of a motion sensor such as an inclination sensor or acceleration sensor has been proposed in Japanese Unexamined Patent Application Publication No. 2003-111171.

When screen operations were performed in the past, for example, a plurality of screen operations, such as a screen operation for changing a position designated on a screen by a cursor or a pointer, a decision operation for deciding a position designated on a screen, a screen operation (which might be the same as the decision operation) for switching a screen to the next screen, and a screen operation for returning a screen to a previous screen might be selectively performed according to user's will.

Further, when the plurality of screen operations was selectively performed in the past, a user might feel troublesome in selecting a screen operation depending on the contents of the operations.

For example, as for the contents are formed so that a plurality of screens such as the above-mentioned map screen and music search screen has hierarchies (depth), a screen operation in the same hierarchy and a screen operation for switching the display to another screen were performed.

Here, as for the map screen, in general, a map screen for displaying the simplest (small scale) large area is used as the uppermost hierarchy, and a map screen for displaying the most detailed (large scale) small area is used as the lowermost hierarchy. Further, as for the music search screen, for example, a screen used to select the genre of music is used as the uppermost hierarchy, and a screen used to select repertoire to album is used as the lowermost hierarchy.

As a screen operation in the same hierarchy of a plurality of screens having hierarchical structure, there has been, for example, a scroll operation of the map screen or an operation for designating a position on a screen where a desired genre can be selected. Further, as a screen operation for switching the display to the another screen, there has been, for example, an operation for changing the scale of the map screen, or an operation for selecting desired music on the screen used to select the genre of music and proceeding to the next screen (for example, an artist selection screen).

Furthermore, when these screen operations were selectively performed, for example, when a screen operation for switching the display from the currently displayed screen to a subordinate screen is selected and when a screen operation for switching the display from the currently displayed screen to a superordinate screen is selected, different buttons (switches) need to be operated, so that a troublesome operation is forcibly performed for a user.

Accordingly, in the past, there is a problem in that a screen operation might not be easily and smoothly selected when a plurality of screen operations is selectively performed.

These and other drawbacks exist.

SUMMARY OF THE DISCLOSURE

An advantage of various embodiments of the invention is to provide an input device that can easily and smoothly select a screen operation and improve operability by reducing the labor of a user.

According to an aspect of the invention, an input device may include an operation surface on which an input operation may be performed by a finger, a first detection means that may detect a contact position of the finger on the operation surface, a second detection means that may detect the movement of an input device body, a third detection means that may detect that the operation surface is pressed, an operation signal generating means that may generate an operation signal used to perform a predetermined operation on a screen displayed by a display device while being interlocked with the detection means, and a transmission means that may send the operation signal, which may be generated by the operation signal generating means, to the display device. The operation signal generating means may generate an operation signal used to perform a first operation on the screen where a detection result of the first detection means has been reflected, when the detection of the contact position by the first detection means is performed without corresponding to the detection of the pressing of the operation surface by the third detection means. Further, the operation signal generating means may generate an operation signal used to perform a second operation on the screen where detection results of the first and third detection means have been reflected, if the duration of the detection of the pressing by the third detection means is shorter than a predetermined time when the detection of the contact position by the first detection means is performed corresponding to the detection of the pressing of the operation surface by the third detection means. Furthermore, the operation signal generating means may generate an operation signal used to perform a third operation on the screen where a detection result of the second detection means has been reflected, as long as the detection of the pressing is continued, if the duration of the detection of the pressing by the third detection means reaches the predetermined time when the detection of the contact position by the first detection means is performed corresponding to the detection of the pressing of the operation surface by the third detection means.

According to various exemplary embodiments, it may be possible to decide which of the first to third operations is to be performed on the screen displayed by the display device by using the time while the operation surface is pressed (including 0 second). Accordingly, it may be possible to easily and smoothly select a screen operation, and to improve operability by reducing the labor of a user. Further, since it may be possible to select a screen operation by the simple operation of a user, the user can continue to perform a desired screen operation without taking one's eyes off the screen.

Further, the third detection means may be a switch that may be pushed down due to the pressing of the operation surface to represent that the operation surface is pressed.

Furthermore, according to various exemplary embodiments, it may be possible to detect the pressing of the operation surface by the simple structure. Therefore, it may be possible to reduce manufacturing cost and size and weight.

In addition, the first operation may be an operation for changing a position designated on the screen while the contact position is changed by making a finger slide on the operation surface, the second operation may be an operation for deciding a position designated when the operation surface is pressed, and the third operation is an operation for changing the screen.

Further, according to various exemplary embodiments, it may be possible to simply decide which of representative and frequently performed screen operations is to be performed. Accordingly, it may be possible to improve operability and versatility.

Furthermore, according to various exemplary embodiments, an input device may include an operation surface on which an input operation may be performed by a finger, a first detection means that may detect a contact position of the finger on the operation surface, a second detection means that may detect the movement of an input device body, an operation signal generating means that may generate an operation signal used to perform a predetermined operation on a screen displayed by a display device while being interlocked with the detection means, and a transmission means for sending the operation signal, which may be generated by the operation signal generating means, to the display device. The operation signal generating means generates an operation signal used to perform a first operation on the screen where a detection result of the first detection means has been reflected, if the duration of the detection, which may be performed at the same contact position by the first detection means, is shorter than a predetermined time when the detection of the contact position by the first detection means is performed. Further, the operation signal generating means generates an operation signal used to perform a second operation on the screen where a detection result of the second detection means has been reflected, as long as the detection is continued at the same contact position, if the duration of the detection, which is performed at the same contact position by the first detection means, reaches the predetermined time when the detection of the contact position by the first detection means is performed.

In addition, according to various exemplary embodiments, it may be possible to decide which of first and second operations is to be performed on the screen displayed a display device by using a contact time at the same contact position on the operation surface. Therefore, it may be possible to easily and smoothly select a screen operation and to improve operability by reducing the labor of a user.

When a screen operation is selected on the basis of a contact time at the same contact position on the operation surface, the first operation may be an operation for changing a position designated on the screen while the contact position is changed by making a finger slide on the operation surface and the second operation may be an operation for changing the screen.

Further, according to various exemplary embodiments, it may be possible to simply decide which of representative and frequently performed screen operations is to be performed. Accordingly, it may be possible to improve operability and versatility.

Furthermore, the operation for changing the screen may be an operation for switching a currently displayed screen among a plurality of screens, which has hierarchical structure, to a superordinate screen of the screen; or an operation for switching the currently displayed screen to a subordinate screen of the screen.

Further, according to various exemplary embodiments, it may be possible to simply switch the display to another screen by moving the input device body. Therefore, it may be possible to further improve operability.

Furthermore, the second detection means may include an acceleration sensor or an inclination sensor.

In addition, according to various exemplary embodiments, it maybe possible to reliably detect the movement of the input device body and to appropriately perform a screen operation by moving the input device body.

According to various exemplary input devices, it may be possible to easily and smoothly select a screen operation and to improve operability by reducing the labor of a user.

DESCRIPTION OF EXEMPLARY EMBODIMENTS

The following description is intended to convey a thorough understanding of the embodiments described by providing a number of specific embodiments and details involving input devices. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

An input device according to various exemplary embodiments will be described below with reference to FIGS. 1 to 7.

Figure 1:
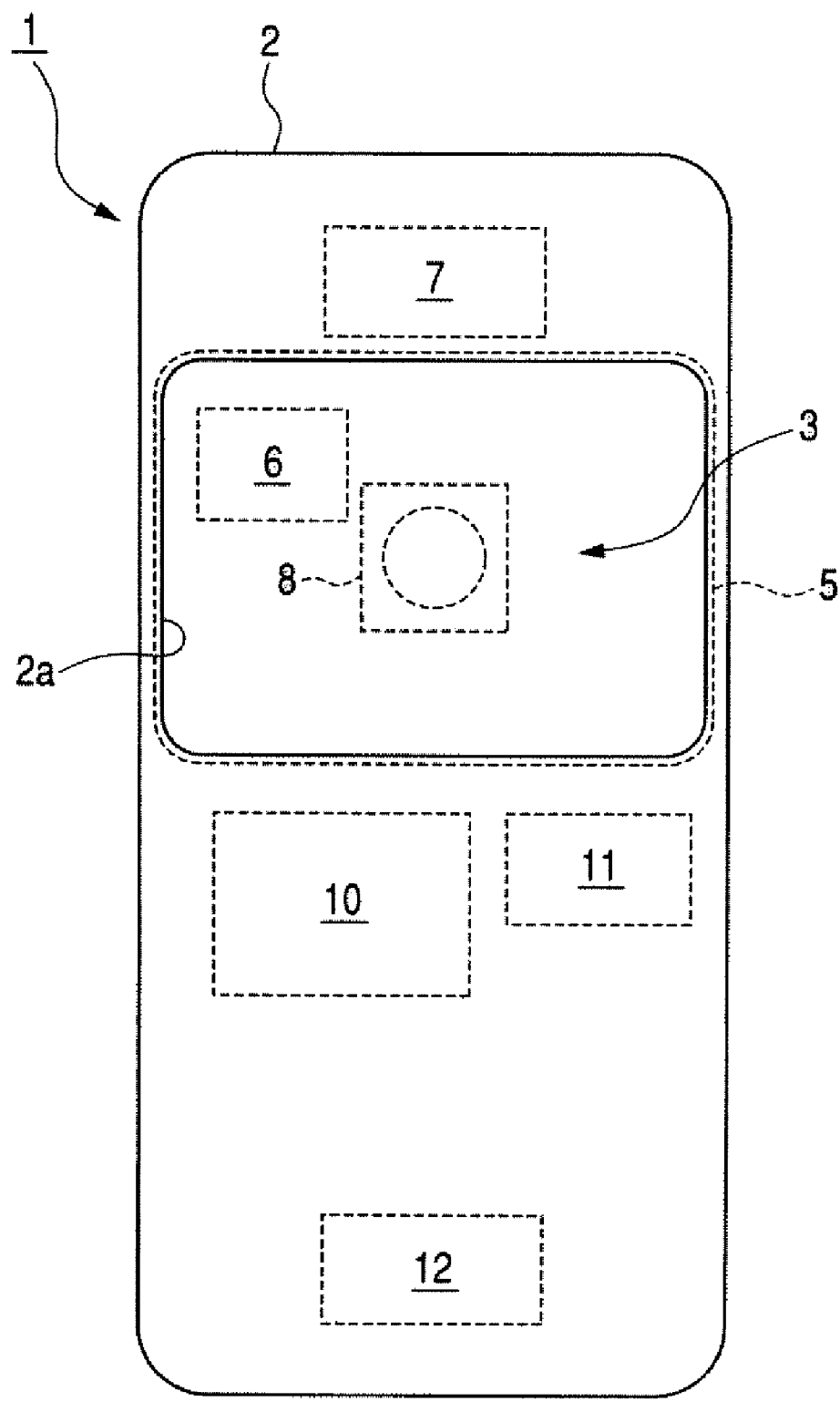
FIG. 1 is a schematic front view of an input device according to an embodiment of the disclosure.
Figure 2:
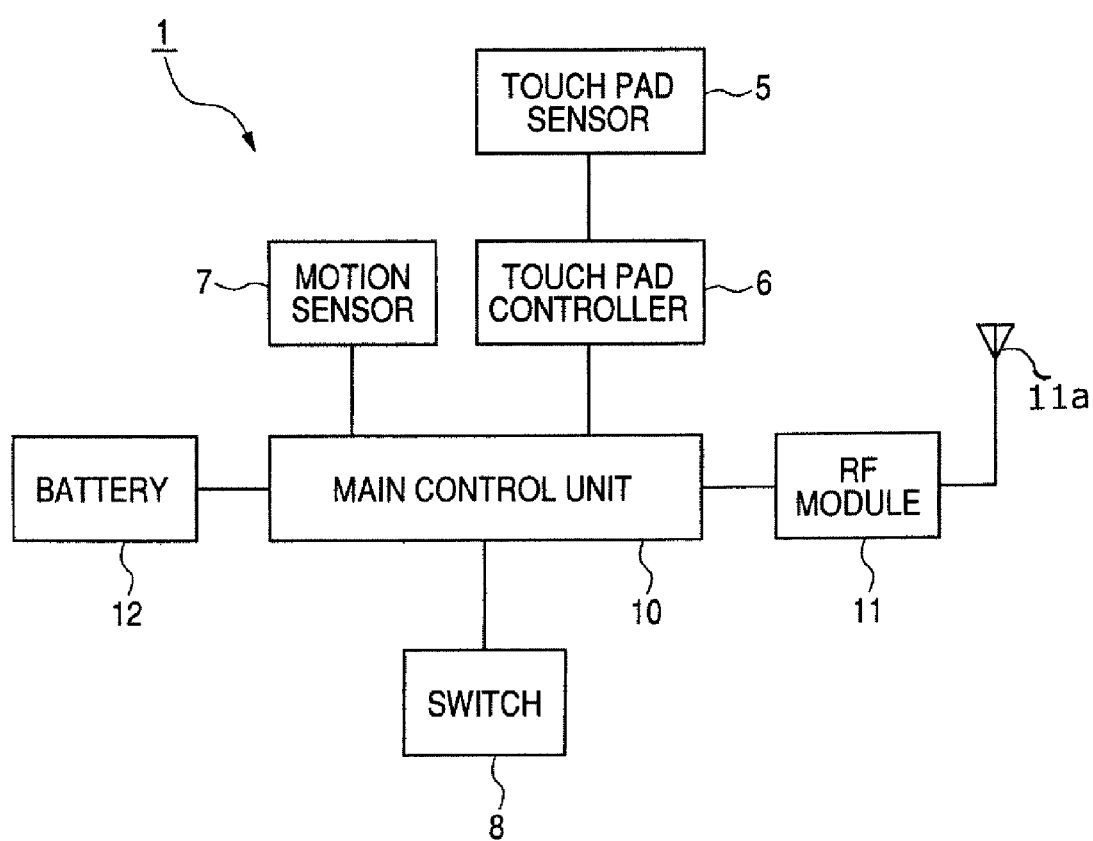
FIG. 2 is a block diagram of an input device according to an embodiment of the disclosure.

FIG. 1 is a schematic front view of an input device 1 according to an embodiment of the invention, and FIG. 2 is a block diagram of the input device 1.

Input device 1 may be used to perform a screen operation on a screen displayed by a display device (not shown) As shown in FIG. 1, the input device 1 may include a hollow case 2 that may be formed in the shape of a rectangular parallelepiped and may have a rectangular opening 2a, and an operation surface 3 of a touch pad may be disposed at the opening 2a of the case 2 so as to face the outside of the case 2.

Meanwhile, the operation surface 3 may be formed on the surface of a flexible and flat face sheet that may be made of a resin material disclosed in, for example, paragraph [0017] of Japanese Unexamined Patent Application Publication No. 2002-351606, the contents of which is incorporated herein by reference in its entirety.

A user can perform an input operation on the operation surface 3 by a finger to perform a screen operation.

Further, a touch pad sensor 5, which may have flexibility and may be formed in the shape of a flat plate, may be provided inside the operation surface 3 in the case 2. The touch pad sensor 5 may be integrally formed with the operation surface 3 50 as to face the entire operation surface 3.

The touch pad sensor 5 may be a capacitance type or pressure-sensitive coordinate input device that may be provided on the back side of an operation surface of a face sheet disclosed in, for example, paragraph [0018] of Japanese Unexamined Patent Application Publication No. 2002-351606, the contents of which is incorporated herein by reference in its entirety.

A touch pad controller 6 is connected to the touch pad sensor 5 as shown in FIG. 2, and the touch pad controller 6 may form a first detection means together with the touch pad sensor 5.

That is, when a user makes one's finger be in contact with the operation surface 3 at a predetermined contact position, a physical quantity (for example, an electric parameter such as a value of capacitance or resistance) may be changed at a portion of the touch pad sensor 5 facing the contact position. The change of the physical quantity may be detected by the touch pad controller 6, so that a detection signal corresponding to the coordinates of the contact position may be output from the touch pad controller 6 as a detection result of the first detection means.

Further, a motion sensor 7 serving as a second detection means may be provided in the case 2 as shown in FIGS. 1 and 2, and the motion sensor 7 may detect the movement of the input device 1 and may output a detection result in the form of a detection signal. The motion sensor 7 may be, for example, an acceleration sensor, an inclination sensor, a distance sensor, or a gyro sensor.

In addition, a switch 8 serving as a third detection means may be provided in the case 2 at a position facing the touch pad sensor 5 as shown in FIGS. 1 and 2, and the switch 8 may detect that the operation surface 3 is pressed.

That is, when the touch pad sensor 5 is curved inside the case 2 due to the pressing of the operation surface 3, the curved touch pad sensor 5 bumps against the switch S, so that the switch is pushed down. While being pushed down, the switch 8 may output a detection signal, which represents that the operation surface 3 is pressed, as a detection result. Meanwhile, when the operation surface 3 is released, the switch 8 returns to a state where the switch is not pushed down and the output of the detection signal then may be terminated.

The switch 8 may have the same structure as that of a switch that includes a dome-shaped inversion plate disclosed in, for example, paragraph [0022] to [0025] of Japanese Unexamined Patent Application Publication No. 2002-351606, the contents of which is incorporated herein by reference in its entirely.

In addition, as shown in FIGS. 1 and 2, a main control unit 10 may be provided in the case 2, and the touch pad controller 6, the motion sensor 7, and the switch 8 may be connected to the main control unit 10. The detection signal output from the touch pad controller 6, the detection signal output from the motion sensor 7, and the detection signal output from the switch 8 may be input to the main control unit 10.

The main control unit 10 may function as an operation signal generating means. While being interlocked with the touch pad controller 6, the motion sensor 7, and the switch 8, the main control unit may generate an operation signal for a predetermined operation that is to be performed on the screen displayed by the display device.

An RF module 11, which may serve as a transmission means including an antenna 11a, is connected to the main control unit 10, and the operation signal generated by the main control unit 10 is input to the RF module 11. Further, the RF module 11 may send the input operation signal to the display device by wireless.

In addition, a battery 12 may be connected to the main control unit 10, and the input device 1 may be operated by electric power that is supplied from the battery 12.

Further, when the input of the detection signal output from the touch pad controller 6 is performed without corresponding to the input of the detection signal output from the switch 8, that is, when the detection of the contact position by the first detection means is performed without corresponding to the detection of the pressing of the operation surface 3 by the third detection means, the main control unit 10 may generate an operation signal that may be used to perform a first operation on the screen.

For examples when a user makes one's finger be in contact with the operation surface 3 without pressing the operation surface 3, the operation signal used to perform the first operation may be generated. Further, the first operation may be a screen operation where the detection result of the first detection means (the touch pad sensor 5 and the touch pad controller 6) has been reflected. As the screen operation, for example, there may be an operation for changing a position designated on the screen by a cursor or a pointer according to the change of the contact position that is performed by making a finger slide on the operation surface 3.

In various exemplary embodiments, if the duration of the input of the detection signal output from the switch 8 (that is, the detection of the pressing of the operation surface 3) is shorter than a predetermined time when the input of the detection signal output from the touch pad controller 6 is performed corresponding to the input of the detection signal output from the switch 8, the main control unit 10 may generate an operation signal that is used to perform a second operation on the screen.

For example, when a user presses the operation surface 3 for a time shorter than the predetermined time while making one's finger be in contact with the operation surface 3 at a predetermined position, the operation signal used to perform the second operation may be generated. Further, the second operation may be a screen operation where the detection result of the first detection means (e.g., the touch pad sensor 5 and the touch pad controller 6) and the detection result of the third detection means (e.g., the switch 8) have been reflected. As the screen operation, for example, there may be an operation for designating a predetermined position on the screen designated when a finger is in contact with and presses the operation surface 3 at the predetermined position. The decision operation may be an operation corresponding to the double click of a mouse.

In various embodiments, if the duration of the input of the detection signal output from the switch 8 reaches the predetermined time when the input of the detection signal output from the touch pad controller 6 is performed corresponding to the input of the detection signal output from the switch 8, the main control unit 10 can thereafter generate an operation signal used to perform a third operation on the screen as long as the input of the detection signal output from the switch 8 is continued.

When a user presses the operation surface 3 for the predetermined time or more while making one's finger be in contact with the operation surface 3, the operation signal used to perform the third operation may be generated. Further, the third operation may be a screen operation where the detection result of the second detection means (e.g., the motion sensor 7) has been reflected. As the screen operation, for example, there may be an operation for switching a currently displayed screen among a plurality of screens, which may have hierarchical structure, to a superordinate screen of the screen; or an operation for switching a currently displayed screen to a subordinate screen of the screen.

Due to the above-mentioned structure, it may be possible to decide which of the first to third operations is to be performed on the screen displayed by the display device by using the time while the operation surface 3 is pressed (including 0 second). Accordingly, it may be possible to easily and smoothly select a screen operation, and to improve operability by reducing the labor of a user. Further, since it is possible to select a screen operation by the simple operation of a user, the user can continue to perform a desired screen operation without taking one's eyes off the screen.

Meanwhile, when the above-mentioned first and second operations are performed, the detection result of the motion sensor 7 may not be reflected in the screen operation. Accordingly, when the first and second operations are performed, the detection operation of the motion sensor 7 may be made unavailable and the detection operation of the motion sensor 7 may begin with a fact that the switch 8 is continuously pushed down for a predetermined time as a momentum. Accordingly, it may be possible to prevent electric power loss from being caused by an unnecessary detection operation of the motion sensor 7.

The operation of this embodiment will be described below with reference to a specific example.

In the following description, the input device 1 is considered as a device for performing a screen operation on music search screens that are displayed by a display device included in an audio reproducing device. The screen operation is an operation for reproducing finally selected music by performing a narrow-down search, which may be required for selecting music, on the music search screens that are composed of a plurality of screens having hierarchical structure.

Figure 3:
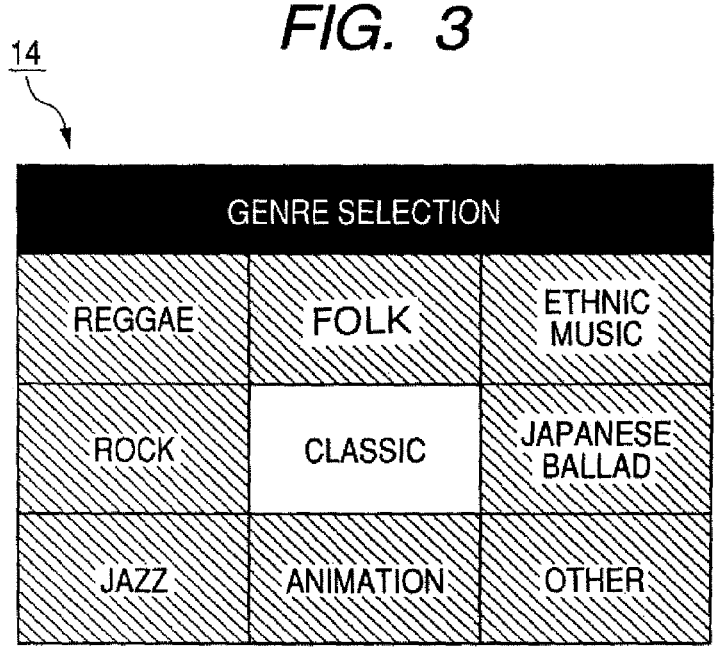
FIG. 3 is a view illustrating a genre selection screen and a sliding operation, which may be performed on an operation surface to perform a screen operation on the screen, of an input device according to an embodiment of the disclosure.
Figure 3:
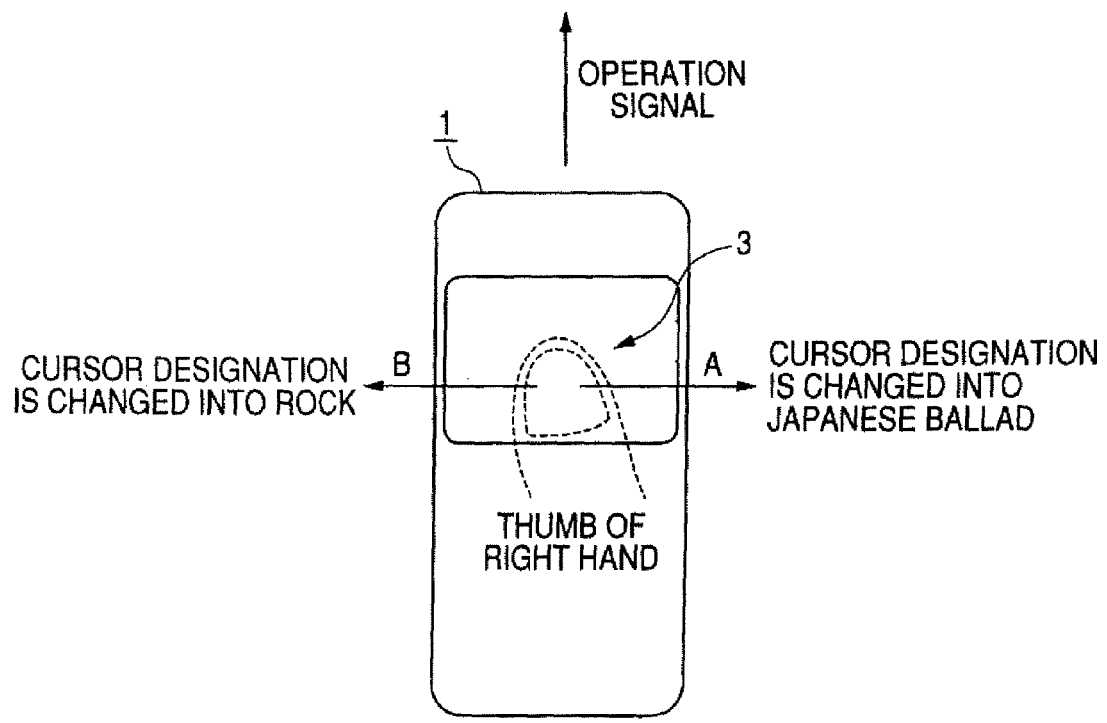

In the initial state, as shown in FIG. 3, a genre selection screen 14 among the music search screens may be displayed on a display unit of the display device by the application for displaying a search screen. Further, an item of "Classic" may be designated by a cursor as a default genre designated on the screen 14 (a position designated on the screen). Furthermore, a user's finger may not be in contact with the operation surface 3 in this case.

Figure 4:
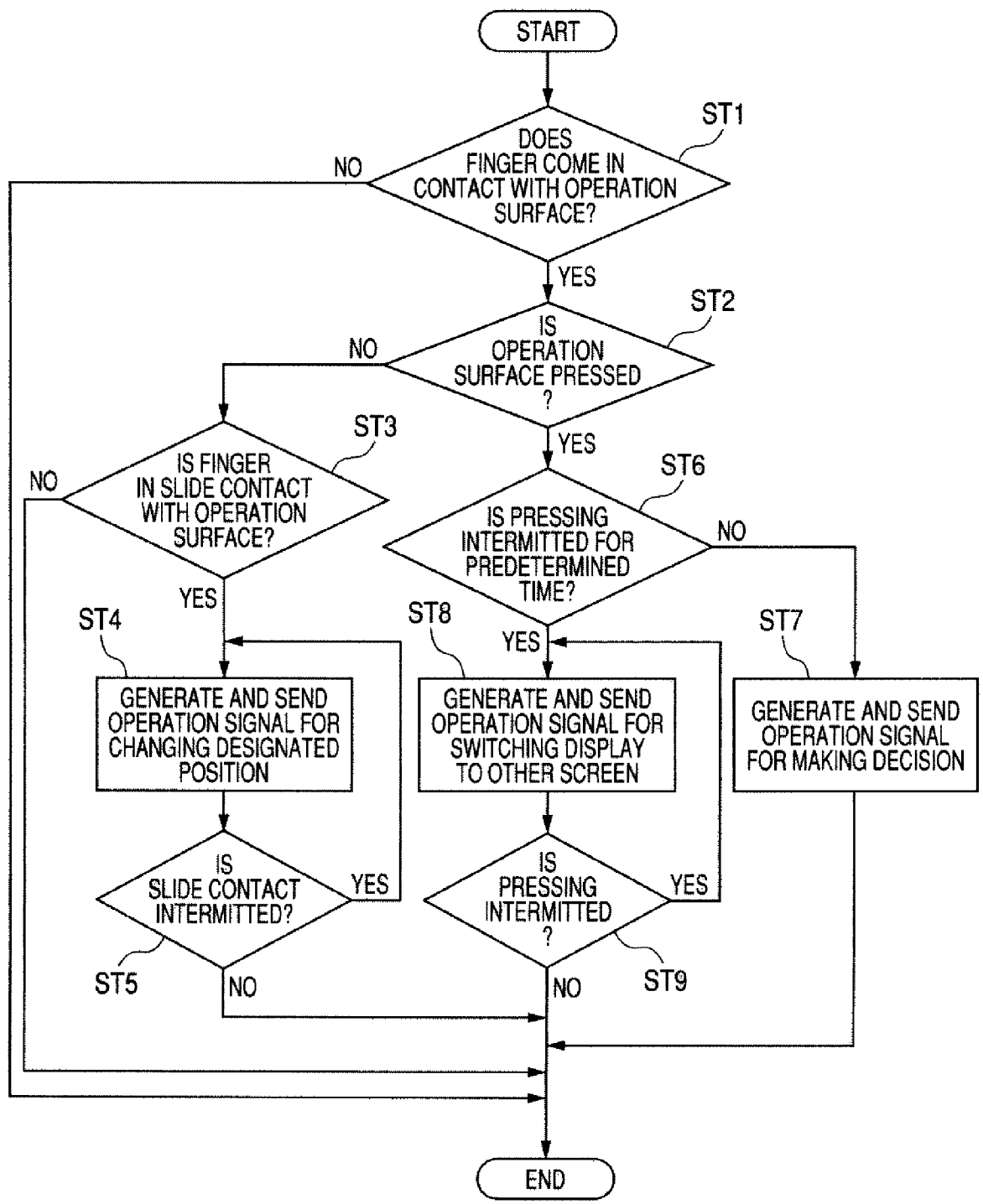
FIG. 4 is a flowchart illustrating an exemplary method of operating an input device according to an embodiment of the disclosure.

In the initial state, first, as shown in Step 1 (ST1) of FIG. 4, the main control unit 10 may determine whether a user's finger is in contact with the operation surface 3 on the basis of whether the detection signal output from the touch pad controller 6 is input. If the user's finger is in contact with the operation surface, the process may proceed to Step 2 (ST2). If the user's finger is not in contact with the operation surface, the process may be terminated. When the process is terminated, the default genre continues to be designated.

Subsequently, in Step 2 (ST2), the main control unit 10 may determine whether the user's finger presses the operation surface 3 on the basis of whether the detection signal output from the switch 8 is input. If the user's finger presses the operation surface, the process may proceed to Step 6 (ST6). If the user's finger does not press the operation surface, the process may proceed to Step 3 (ST3).

In Step 3 (ST3), it may be determined whether the user's finger slides on the operation surface 3 on the basis of the detection signal output from the touch pad controller 6. If the user's finger slides on the operation surface, the process may proceed to Step 4 (ST4). If the user's finger does not slide on the operation surface, the process may be terminated. Even when the process is terminated in this case, the default genre continues to be designated.

After that, in Step 4 (ST4), the main control unit 10 may generate an operation signal, which may be used to change the position designated on the genre selection screen 14 (the position designated on the genre selection screen), on the basis of the detection signal input from the touch pad controller 6. Further, the main control unit may send the generated operation signal to the display device by the RF module 11.

Accordingly, the genre designated on the genre selection screen 14 may be changed in the display device by the application in accordance with the operation signal sent from the RF module 11. In this exemplary embodiment, a genre displayed in a direction corresponding to the sliding direction of the finger on the operation surface 3 maybe set in the display device as a genre that is newly designated after the change. For example, as shown in FIG. 3, if the sliding direction of the finger on the operation surface 3 corresponds to a right direction (arrow A) of FIG. 3, "Japanese ballad" displayed on the right side of "Classic" on the genre selection screen 14 may be newly designated by a cursor. Further, if the sliding direction corresponds to a left direction (arrow B), "Rock" displayed on the left side of "Classic" may be newly designated by a cursor.

Subsequently, in Step 5 (ST5) subsequent to Step 4 (ST4), the main control unit 10 may determine whether the finger continues to slide on the operation surface 3 on the basis of the detection signal input from the touch pad controller 6. If the finger continues to slide on the operation surface, the process may return to Step 4 (ST4). If the finger does not continue to slide on the operation surface, the process may be terminated. When the process is terminated, a genre designated at the time of the termination of the sliding may be maintained as a designated genre.

Meanwhile, in Step 6 (ST6), the main control unit 10 may determine whether the operation surface 3 continues to be pressed for a predetermined time or more on the basis of the input duration of the detection signal output from the switch 8. If the operation surface continues to be pressed for a predetermined time or more, the process may proceed to Step 8 (ST8). If the operation surface does not continue to be pressed for a predetermined time or more, the process may proceed to Step 7 (ST7).

In Step 7 (ST7), the main control unit 10 may generate an operation signal, which may be used to decide the designated genre on the genre selection screen 14, on the basis of the detection signal input from the touch pad controller 6 and the detection signal output from the switch 8. Further, the main control unit may send the generated operation signal to the display device by the RF module 11.

Figure 5:
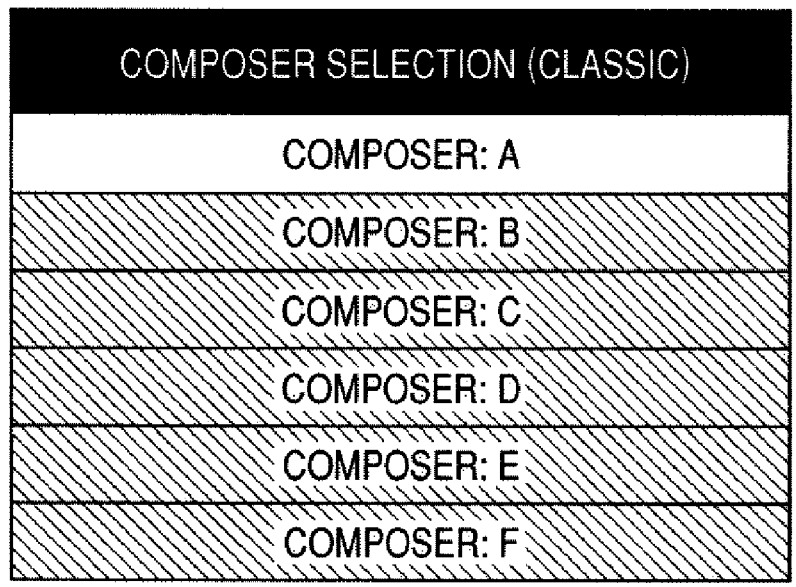
FIG. 5 is a view showing a display of a composer selection screen of an input device according to an embodiment of the disclosure.

Accordingly, a decision operation about the genre designated on the genre selection screen 14 ("Classic" in FIG. 3) may be performed in the display device by the application. Due to the decision operation, as shown in FIG. 5, the display device may display a composer selection screen 15, which may belong to the item of "Classic" selected as a designated genre, as a subordinate screen of the genre selection screen 14 by the application.

Figure 6:
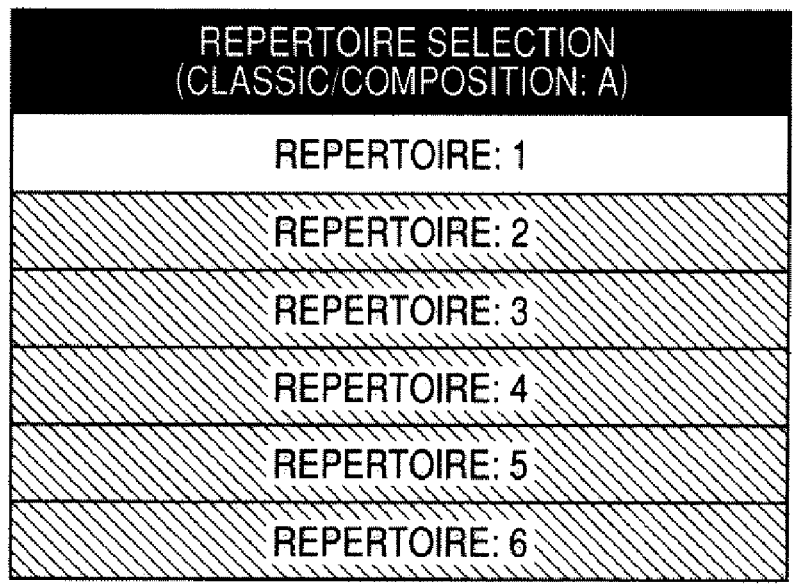
FIG. 6 is a view showing a display of a repertoire selection screen of an input device according to an embodiment of the disclosure.

Meanwhile, "Composer: A" may be designated on the composer selection screen 15 as a default by a cursor. However, it may be possible to change a composer, which is designated by a cursor, even on the composer selection screen 15 by making a finger slide on the operation surface 3. Further, it may be possible to perform a decision operation about the composer, which may be designated by a cursor, by pressing the operation surface 3 for a time less than a predetermined time. For example, if a decision operation about the item of "Composer: A" is performed on the composer selection screen 15, as shown in FIG. 6, the display device may display a repertoire selection screen 16, which may belong to the item of "Composer: A", as a subordinate screen of the composer selection screen 15. The repertoire of music composed by Composer A may be displayed on the repertoire selection screen 16 in the form of a list so as to be selected. If a decision operation is performed about the repertoire that is designated on the repertoire selection screen 16 by a cursor, music corresponding to the decided repertoire of Composer A (for example, "Repertoire; 1" in FIG. 6) may be reproduced.

Meanwhile, in Step 8 (ST8), the main control unit 10 may generate an operation signal, which may be used to switch the display from the currently displayed genre selection screen 14 to another screen, on the basis of the detection signal output from the motion sensor 7. Further, the main control unit may send the generated operation signal to the display device by the RF module 11.

Figure 7:
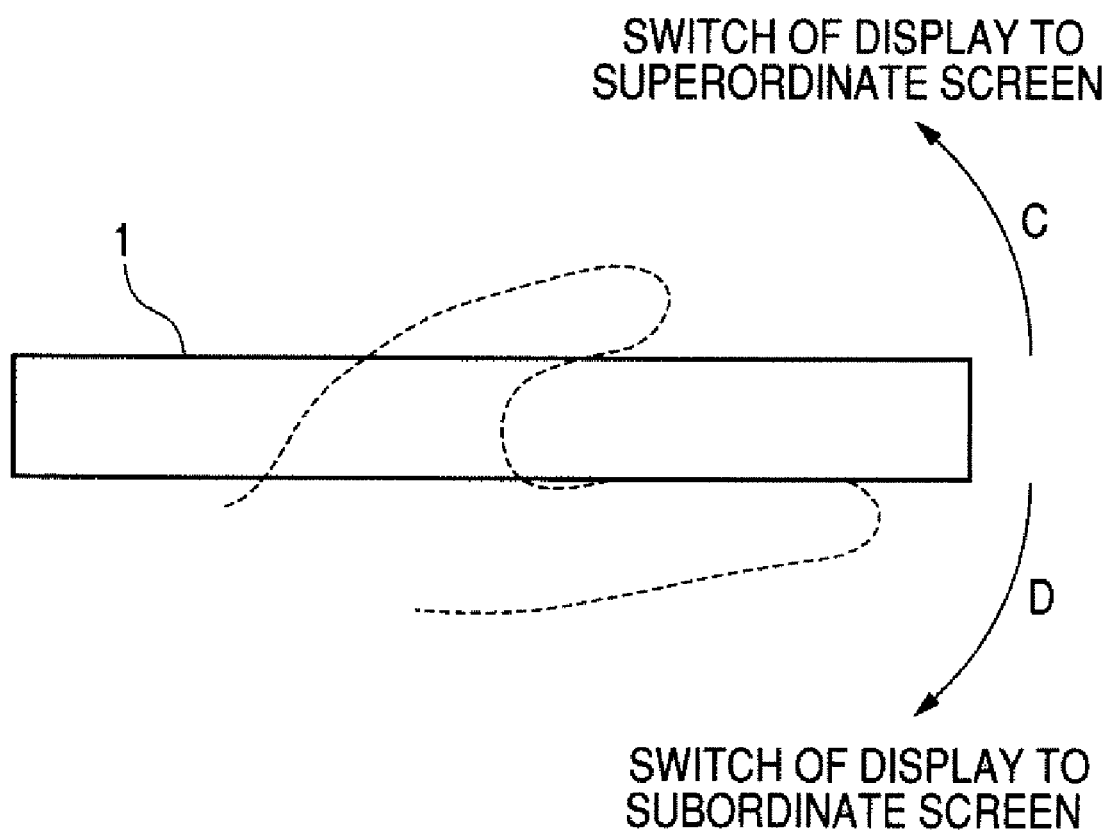
FIG. 7 is a view illustrating the operation of an input device when a screen is switched to other screens in the input device according to an embodiment of the disclosure.

Accordingly, the display may be switched from the genre selection screen 14 to other screens in the display device by the application. In this case, the display device may control to which the superordinate and subordinate screens of the genre selection screen 14 the display is to be switched. For example, as shown in FIG. 7, if the input device 1 is moved upward with a predetermined acceleration or more in a vertical direction (arrow C), the display may be switched to the superordinate screen of the genre selection screen 14 (as long as there is a superordinate screen). If the input device 1 is moved downward with a predetermined acceleration or more in a vertical direction (arrow D), the display may be switched to the subordinate screen of the genre selection screen 14.

Further, if a user moves the input device 1 downward in the vertical direction in the case of an example of FIG. 7, it may be possible to switch the display to the above-mentioned composer selection screen 15 by the display device.

In this exemplary embodiment, the switching of the display to the composer selection screen 15 can also be performed by the decision operation about the item of "Classic" on the genre selection screen 14 as described above. However, a screen switching operation, which may use the detection result of the motion sensor 7 caused by the movement of the input device 1, may become particularly meaningful when the display returns to the genre selection screen 14 from the composer selection screen 15.

That is, when the display returns to the superordinate screen 14 from the subordinate screen 15, a decision operation should be performed after an item of "Return" is designated. In contrast, since the input device 1 only needs to be moved in a direction opposite to a direction corresponding to the narrow-down (downward in the vertical direction in FIG. 7) in this embodiment, an operation is simply performed.

Subsequently, in Step 9 (ST9) subsequent to Step 8 (ST8), the main control unit 10 may determine whether the operation surface 3 continues to be pressed on the basis of the detection signal input from the switch 8. If the operation surface 3 continues to be pressed, the process may return to Step 8. If the operation surface does not continue to be pressed, the process may be terminated.

As described above, according to this exemplary embodiment, it may be possible to decide which of the first to third operations is to be performed on the screen displayed by the display device by using the time while the operation surface 3 is pressed. Accordingly, it may be possible to easily and smoothly select a screen operation, and to improve operability by reducing the labor of a user.

Meanwhile, the invention is not limited to the above-mentioned embodiment, and may have various modifications if necessary.

For example, an operation, which changes the display to the enlarged display of a screen or the rotated display of a screen in accordance with the movement of the motion sensor 7, may be performed as the second operation.

In addition, various screen operations may be performed in accordance with a method of operating the operation surface 3. For example, if a finger slides on the operation surface 3 while pressing the operation surface 3, a drag operation or a screen operation for designating a broad area on a screen or a drag operation may be performed.

In addition, the above-mentioned embodiments have been made so that a screen operation is selected on the basis of the time while the operation surface 3 is pressed, but the invention is not limited to this structure. For example, embodiments of the invention may be made so that a screen operation is selected by the time while a finger is in contact with the operation surface 3 at the same contact position.

More specifically, the embodiments of invention may be made as follows: if the duration of the detection at the same contact position is shorter than a predetermined time when a contact position on the operation surface 3 is detected by the first detection means 5 and 6, the main control unit 10 may generate an operation signal used to perform an operation on a screen where the detection results of the first detection means S and 6 have been reflected. For example, the operation may be an operation for changing a position designated on the screen while a user makes one's finger slide on the operation surface 3. Meanwhile, if the duration of the detection at the same contact position is equal to or longer than a predetermined time when a contact position on the operation surface 3 is detected by the first detection means 5 and 6, the main control unit 10 may generate an operation signal used to perform an operation on a screen where the detection result of the second detection means 7 has been reflected. For example, the operation may be an operation for switching a currently displayed screen among a plurality of screens, which has hierarchical structure, to a superordinate screen of the screen; or an operation for switching a currently displayed screen to a subordinate screen of the screen. Further, in this exemplary embodiment, a decision operation about the screen may be performed by tapping the operation surface 3.

It should be understood by those skilled in the art that various modifications, combinations, sub-combinations and alterations may occur depending on design requirements and other factors insofar as they are within the scope of the appended claims of the equivalents thereof. Accordingly, the embodiments of the present inventions are not to be limited in scope by the specific embodiments described herein. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. An input device comprising:
   an input device body that encases the input device, the input device body having an operation surface on which an input operation is performed by a finger;
   a first detection means that detects a contact position of the finger on the operation surface;
   a second detection means that detects the movement of the input device body;
   a third detection means for detecting that the operation surface is pressed;
   a signal generating means that generates a signal that controls a screen displayed by a display device while being interlocked with the detection means; and
   a transmission means for sending the signal, which is generated by the signal generating means, to the display device,
   wherein the signal generating means generates a first signal for a first control of the screen where a detection result of the first detection means has been reflected when the detection of the contact position by the first detection means is performed without corresponding to the detection of the pressing of the operation surface by the third detection means,
   the signal generating means generates a second signal for a second control of the screen where detection results of the first and third detection means have been reflected if the duration of the detection of the pressing by the third detection means is shorter than a predetermined time when the detection of the contact position by the first detection means is performed corresponding to the detection of the pressing of the operation surface by the third detection means, and
   the signal generating means generates a third signal for a third control of the screen where a detection result of the second detection means has been reflected, as long as the detection of the pressing is continued if the duration of the detection of the pressing by the third detection means reaches the predetermined time when the detection of the contact position by the first detection means is performed corresponding to the detection of the pressing of the operation surface by the third detection means.

2. The input device according to claim 1, wherein the third detection means is a switch that is pushed down due to the pressing of the operation surface to represent that the operation surface is pressed.

3. The input device according to claim 1,
   wherein the first control is a control for changing a position designated on the screen while the contact position is changed by making a finger slide on the operation surface,
   the second control is a control for deciding a position designated when the operation surface is pressed, and
   the third control is a control for changing the screen.

4. The input device according to claim 3,
   wherein the control for changing the screen is a control for switching a currently displayed screen among a plurality of screens, which has hierarchical structure, to a superordinate screen of the screen; or a control for switching the currently displayed screen to a subordinate screen of the screen.

5. The input device according to claim 1,
   wherein the second detection means includes an acceleration sensor or an inclination sensor.

6. An input device comprising:
   an input device body that encases the input device, the input device body having an operation surface on which an input operation is performed by a finger;
   a first detection means that detects a contact position of the finger on the operation surface;
   a second detection means that detects the movement of the input device body;
   a signal generating means that generates a signal that controls a screen displayed by a display device while being interlocked with the detection means; and
   a transmission means for sending the signal, which is generated by the signal generating means, to the display device,
   wherein the signal generating means generates a first signal for a first control of the screen where a detection result of the first detection means has been reflected, if the duration of the detection, which is performed at the same contact position by the first detection means, is shorter than a predetermined time when the detection of the contact position by the first detection means is performed, and
   the signal generating means generates a second signal for a second control of the screen where a detection result of the second detection means has been reflected, as long as the detection is continued at the same contact position, if the duration of the detection, which is performed at the same contact position by the first detection means, reaches the predetermined time when the detection of the contact position by the first detection means is performed.

7. The input device according to claim 6,
   wherein the first control is a control for changing a position designated on the screen while the contact position is changed by making a finger slide on the operation surface, and
   the second control is a control for changing the screen.

8. The input device according to claim 6,
   wherein the second detection means includes an acceleration sensor or an inclination sensor.

9. An input device comprising:
   an input device body that encases the input device, the input device body having an operation surface on which an input operation is performed by a finger;
   a touch pad unit that detects a contact position of the finger on the operation surface;
   a motion sensor that detects the movement of the input device body;

a switch that detects whether the operation surface is being pressed;

a signal generating means that generates a signal that controls a screen displayed by a display device while being interlocked with the detection means; and a transmission means for sending the signal, which is generated by the signal generating means, to the display device, wherein the signal generating means generates a first signal for a first control of the screen where a detection result of the touch pad unit has been reflected, when the detection of the contact position by the touch pad unit is performed without corresponding to the detection of the pressing of the operation surface by the switch, the signal generating means generates a second signal for a second control of the screen where detection results of the touch pad unit and switch have been reflected, if the duration of the detection of the pressing by the switch is shorter than a predetermined time when the detection of the contact position by the touch pad unit is performed corresponding to the detection of the pressing of the operation surface by the switch, and the signal generating means generates a third signal for a third control of the screen where a detection result of the motion sensor has been reflected, as long as the detection of the pressing is continued, if the duration of the detection of the pressing by the switch reaches the predetermined time when the detection of the contact position by the touch pad unit is performed corresponding to the detection of the pressing of the operation surface by the switch.

10. The input device according to claim 9, wherein the touch pad unit comprises a touch pad sensor and a touch pad controller.

11. The input device according to claim 9, wherein the switch is pushed down due to the pressing of the operation surface to represent that the operation surface is pressed.

12. The input device according to claim 9, wherein the first control is a control for changing a position designated on the screen while the contact position is changed by making a finger slide on the operation surface, the second control is a control for deciding a position designated when the operation surface is pressed, and the third control is a control for changing the screen.

13. The input device according to claim 9, wherein the motion sensor includes an acceleration sensor or an inclination sensor.

14. An input device comprising:

an input device body that encases the input device, the input device body having an operation surface on which an input operation is performed by a finger;

a touch pad unit that detects a contact position of the finger on the operation surface;

a motion sensor that detects the movement of the input device body;

an signal generator that generates a signal that controls a screen displayed by a display device while being interlocked with the detection means; and an radio frequency transmitter that sends the control signal, which is generated by the signal generator, to the display device, wherein the signal generator generates a first signal for a first control of the screen where a detection result of the touch pad unit has been reflected, if the duration of the detection, which is performed at the same contact position by the touch pad unit, is shorter than a predetermined time when the detection of the contact position by the touch pad unit is performed, and the signal generator generates a second signal for a second control of the screen where a detection result of the motion sensor has been reflected, as long as the detection is continued at the same contact position, if the duration of the detection, which is performed at the same contact position by the touch pad unit, reaches the predetermined time when the detection of the contact position by the touch pad unit is performed.

15. The input device according to claim 14, wherein the touch pad unit comprises a touch pad sensor and a touch pad controller.

16. The input device according to claim 14, wherein the first control is a control for changing a position designated on the screen while the contact position is changed by making a finger slide on the operation surface, and the second control is a control for changing the screen.

17. The input device according to claim 16, wherein the for changing the screen is a control for switching a currently displayed screen among a plurality of screens, which has hierarchical structure, to a superordinate screen of the screen; or a control for switching the currently displayed screen to a subordinate screen of the screen.

18. The input device according to claim 14, wherein the motion sensor includes an acceleration sensor or an inclination sensor.

* * * * *